United States Patent
Hanawa et al.

(10) Patent No.: US 7,673,901 B2
(45) Date of Patent: Mar. 9, 2010

(54) AIRBAG DEVICE

(75) Inventors: Akifumi Hanawa, Ibaraki (JP); Shinobu Yamamoto, Ibaraki (JP); Yosuke Shimizu, Ibaraki (JP); Keiko Aita, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 506 days.

(21) Appl. No.: 11/449,704

(22) Filed: Jun. 9, 2006

(65) Prior Publication Data

US 2006/0279072 A1 Dec. 14, 2006

(30) Foreign Application Priority Data

Jun. 10, 2005 (JP) ............................. 2005-170431

(51) Int. Cl.
*B60R 21/231* (2006.01)
*B60R 21/233* (2006.01)

(52) U.S. Cl. .................................. 280/743.1; 280/729

(58) Field of Classification Search ................ 280/729, 280/743.1, 743.2

See application file for complete search history.

(56) References Cited

U.S. PATENT DOCUMENTS

| 5,253,892 | A | * | 10/1993 | Satoh | 280/731 |
| 5,362,101 | A | * | 11/1994 | Sugiura et al. | 280/743.2 |
| 5,945,184 | A | * | 8/1999 | Nagata et al. | 428/35.2 |
| 6,042,147 | A | * | 3/2000 | Nishijima et al. | 280/743.1 |
| 6,086,092 | A | * | 7/2000 | Hill | 280/729 |
| 6,254,121 | B1 | * | 7/2001 | Fowler et al. | 280/729 |
| 6,361,072 | B1 | * | 3/2002 | Barnes | 280/743.1 |
| 6,419,262 | B1 | * | 7/2002 | Fendt et al. | 280/729 |
| 6,554,316 | B2 | * | 4/2003 | Schneider et al. | 280/743.1 |
| 7,073,818 | B2 | * | 7/2006 | Hasebe | 280/729 |
| 7,255,367 | B2 | * | 8/2007 | Bauer et al. | 280/743.1 |
| 7,350,807 | B2 | * | 4/2008 | Schneider et al. | 280/732 |
| 7,396,043 | B2 | * | 7/2008 | Choi et al. | 280/743.1 |
| 7,445,232 | B2 | * | 11/2008 | Takimoto | 280/729 |
| 2001/0033072 | A1 | * | 10/2001 | Kumagai et al. | 280/730.1 |
| 2002/0005632 | A1 | * | 1/2002 | Bohn et al. | 280/728.3 |
| 2002/0084638 | A1 | * | 7/2002 | Neupert | 280/743.1 |
| 2003/0218325 | A1 | * | 11/2003 | Hasebe et al. | 280/743.2 |
| 2004/0145160 | A1 | * | 7/2004 | Hasebe et al. | 280/729 |
| 2004/0155440 | A1 | * | 8/2004 | Hasebe et al. | 280/729 |
| 2004/0183288 | A1 | * | 9/2004 | Aygun et al. | 280/731 |
| 2004/0232681 | A1 | * | 11/2004 | Adomeit | 280/743.1 |
| 2005/0104339 | A1 | * | 5/2005 | Hasebe et al. | 280/729 |
| 2005/0184489 | A1 | * | 8/2005 | Kobayashi | 280/729 |

FOREIGN PATENT DOCUMENTS

| JP | 4-56652 | 2/1992 |
| JP | 04201644 A | * 7/1992 |

(Continued)

*Primary Examiner*—Paul N Dickson
*Assistant Examiner*—Laura Freedman
(74) *Attorney, Agent, or Firm*—Clark & Brody

(57) ABSTRACT

An airbag has a front panel positioned on an occupant side when inflated, and a rear panel of substantially the same shape as the front panel positioned on an opposite side to the occupant. Furthermore, an inflation restricting section, which restricts the inflated shape of the airbag, is formed by drawing together and fixing a portion of the front panel. When the airbag is inflated, the occupant side of the airbag is pulled inwards, thereby forming a cavity on the occupant side.

9 Claims, 7 Drawing Sheets

FOREIGN PATENT DOCUMENTS

| | | |
|---|---|---|
| JP | 04292239 A * | 10/1992 |
| JP | 2001-233157 | 8/2001 |
| JP | 2001-287613 | 10/2001 |
| JP | 2002-46568 | 2/2002 |
| JP | 2002-166805 | 6/2002 |
| JP | 2003-335203 | 11/2003 |
| JP | 2004-502585 | 1/2004 |
| JP | 2004-244005 | 9/2004 |

* cited by examiner

AIRBAG DEVICE

CROSS REFERENCE TO RELATED APPLICATION

This application claims the priority of Application No. 2005-170431, filed Jun. 10, 2005 in Japan, the subject matter of which is incorporated herein by reference.

TECHNICAL FIELD OF THE INVENTION

The present invention relates to an airbag device for a vehicle, and relates in particular to an airbag device which protects an occupant of a driving seat or passenger seat.

BACKGROUND OF THE INVENTION

With airbag devices, particularly driver-side airbags housed in the central part of the steering wheel and passenger-side airbags housed in an instrument panel (instrument panel), fast inflation of the airbag is essential. On the other hand, there is also a need to reduce the incidence of damage to the head or neck of any occupants. In particular, there is a great need to lower the injury values of passengers who are positioned too close to the steering wheel or instrument panel.

The invention disclosed in Japanese Unexamined Patent Publication No. 2003-335203 comprises two air bags positioned on the left and right relative to the occupant, the occupant side ends of which are connected by a tie panel.

However, when the airbags of the invention disclosed in Japanese Unexamined Patent Publication No. 2003-335203 are inflated, there is a danger of the tie panel contacting (applying a shock to) the head or neck of the occupant, aggravating his or her neck injury value. Such a problem occurs not only in out-of-position situations where the occupant is too close to the steering wheel or instrument panel, but also when the occupant is seated normally. Furthermore, the addition of the tie panel increases the number of components, which reduces cost efficiency and complicates the manufacturing process.

OBJECTS OF THE INVENTION

Accordingly, an object of the present invention is to provide an airbag device and a method of manufacturing an airbag, which reduces neck injury values without sacrificing occupant restraining performance.

Another object of the present invention is to provide an airbag device and a method of manufacturing an airbag, which is based on a simple construction and process and can be easily manufactured.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, an airbag has a front panel positioned on an occupant side when inflated, and a rear panel of substantially the same shape as the front panel positioned on an opposite side to the occupant. Furthermore, an inflation restricting section, which restricts the inflated shape of the airbag, is formed by drawing together and fixing a portion of the front panel. When the airbag is inflated, the occupant side of the airbag is pulled inwards, thereby forming a cavity (depressed region) on the occupant side.

The inflation restricting section can be formed by cutting away a portion of the front panel to form an opening, and then closing the opening by stitching or the like. The opening can be closed by stitching together the edges on the left and right when viewed from the occupant side. As a result, when the airbag is inflated, the portions of the panel near the opening (left and right) are pulled inward, or prevented from spreading outward, thereby forming a cavity (depressed region) near the center of the front of the airbag.

An important point of the present invention is that the front panel and the rear panel are of substantially the same shape, and a separate member is not used to restrict the inflated shape of the airbag. Furthermore, "drawing together and fixing" refers to a form where at least two portions of the front panel positioned some distance apart are brought into contact by such methods as pulling the portions towards each other, and the contacting or overlapping portions are then fixed by such methods as stitching or bonding. Here, "fixing" does not necessarily mean providing a hermetic seal. It is also possible to describe forming the inflation restricting section as "reducing the amount of foundation cloth in the front panel that is directly involved in forming the airbag".

The inflation restricting section, instead of using a hole such as an opening, can use a construction in which portions of the front panel are simply drawn together and stitched in place. In this case, a cut such as a slit can be made in the front panel to allow the panel to be drawn together more easily. In a case where openings are used to form the inflation restricting section, the process can be described as "reducing the amount of foundation cloth without changing the external shape or dimensions of the front panel".

Because the front panel and the rear panel have substantially the same shape, an airbag can be formed by using a "flat seam" around the periphery of the panels to stitch the panels together, which streamlines and simplifies the manufacturing process (seaming operation).

There are preferably two openings located left-right symmetrically from the perspective of the occupant. However the number and location of the openings is not limited to this configuration, and configurations in which one opening is centrally located or four openings are left-right symmetrically located may also be used. Basically, if the airbag is intended to inflate in a left-right symmetrical fashion, preferably the openings are left-right symmetrically located. If the airbag is intended to inflate in a left-right symmetrical fashion, the openings may be formed in a left-right symmetrical manner.

The openings are preferably formed in an eye shape extending substantially in the vertical direction. An opening shaped like a vertical eye can be easily closed by stitching along the gentle curve the shape provides.

When a vehicle is involved in an incident such as a collision and the airbag is inflated, the shoulder region of the occupant contacts the projecting portions on either side of the airbag, and his or her head enters the cavity. As a result, the chest region of the occupant is protected by the space formed by the cavity, while his or her head is protected by the space of the cavity or by the bottom of the cavity. In other words, there is less danger of the head of an occupant forcefully contacting (striking) a tie panel or the like and injuring his or her neck, as occurred with conventional airbags. Because the shoulder region of a person is better able to withstand an impact than his or her head (or neck), the damage to the occupant is reduced. In this manner, neck injuries can be reduced without losing occupant restraining performance, regardless of whether the occupant is seated normally or seated abnormally close to the instrument panel. Furthermore, because a separate member such as a tie panel is not required, the number of components is not increased, which is cost effective and also simplifies the manufacturing process.

An inflatable second airbag may also be provided within the cavity of the front panel. In this case, the second airbag is formed so as to not completely fill the cavity, but to fit inside, thereby retaining the function of the cavity. Normally the second airbag is smaller than the first airbag, and is set back substantially at the center of the first airbag which projects at the left and right. When an incident such as a collision occurs and the airbag is inflated, the chest and shoulder regions of the occupant contact the portions of the first airbag which project at the left and right, and the head enters the cavity and contacts the second airbag. As a result, the restraining force is improved, particularly for the heads (necks) of adult males, when compared to a case where the second airbag is not provided. In other words, situations in which the head of the occupant enters the cavity of the first airbag and is not restrained in any way, causing injury to the neck or the like of the occupant, can be effectively prevented.

A method of manufacturing an airbag according to a second aspect of the invention includes steps of: (1) preparing a front panel in sheet form to be located on the occupant side when inflated, and a rear panel in sheet form of substantially the same shape as the front panel to be located on the opposite side to the occupant when inflated; (2) superposing the front panel and the rear panel, and stitching together peripheral edges thereof by flat seaming; and (3) drawing together and securing portions of the front panel so as to restrict an inflated shape of the airbag. According to the present invention, because the airbag can be formed by so-called "flat stitching" or "flat seaming", the manufacturing process (stitching operation) can be streamlined and simplified.

DETAILED DISCLOSURE OF THE INVENTION

In the following detailed description of the preferred embodiments, reference is made to the accompanying drawings which form a part thereof, and in which is shown by way of illustration specific preferred embodiments in which the invention may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
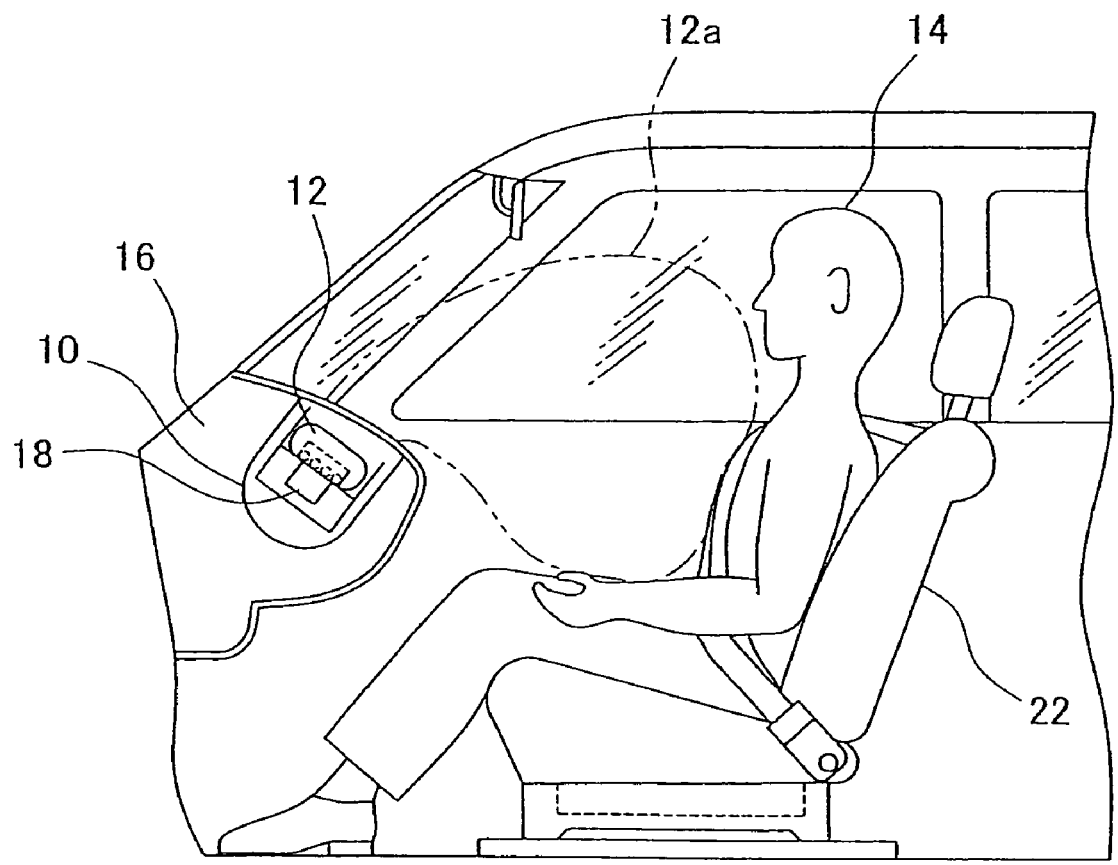
FIG. 1 is an explanatory drawing showing the operation of a typical airbag device.

FIG. 1 is an explanatory drawing showing a typical airbag device in operation. An airbag device 10 according to an embodiment of the present invention comprises an inflatable airbag 12 housed in a housing 20, and an inflator 18 which produces inflating gas. The airbag device 10 is disposed, for example, inside an instrument panel 16, in order to restrain an occupant 14 seated in a passenger seat. The present invention can also be applied to a driver-side airbag installed inside the steering wheel. In the figures, reference numeral 12a denotes an airbag in an inflated state, and reference numeral 22 denotes a passenger seat. Details about the actual inflation of the airbag of the present invention are described below.

Figure 2:
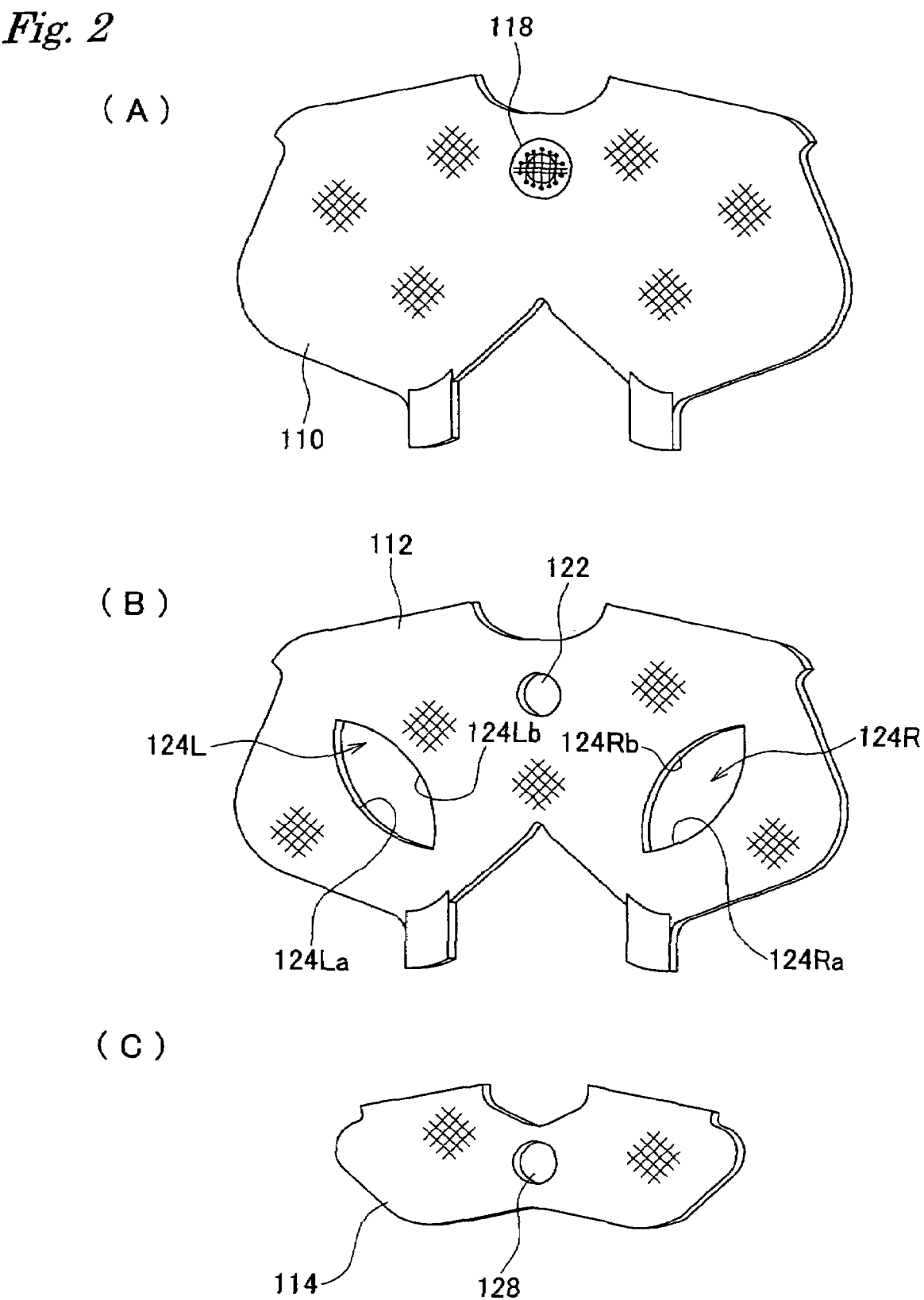
FIG. 2 is a plan view showing a rear panel (A), a front panel (B), and a center panel (C), which constitute an airbag of an airbag device according to a first embodiment of the present invention.
Figure 3:
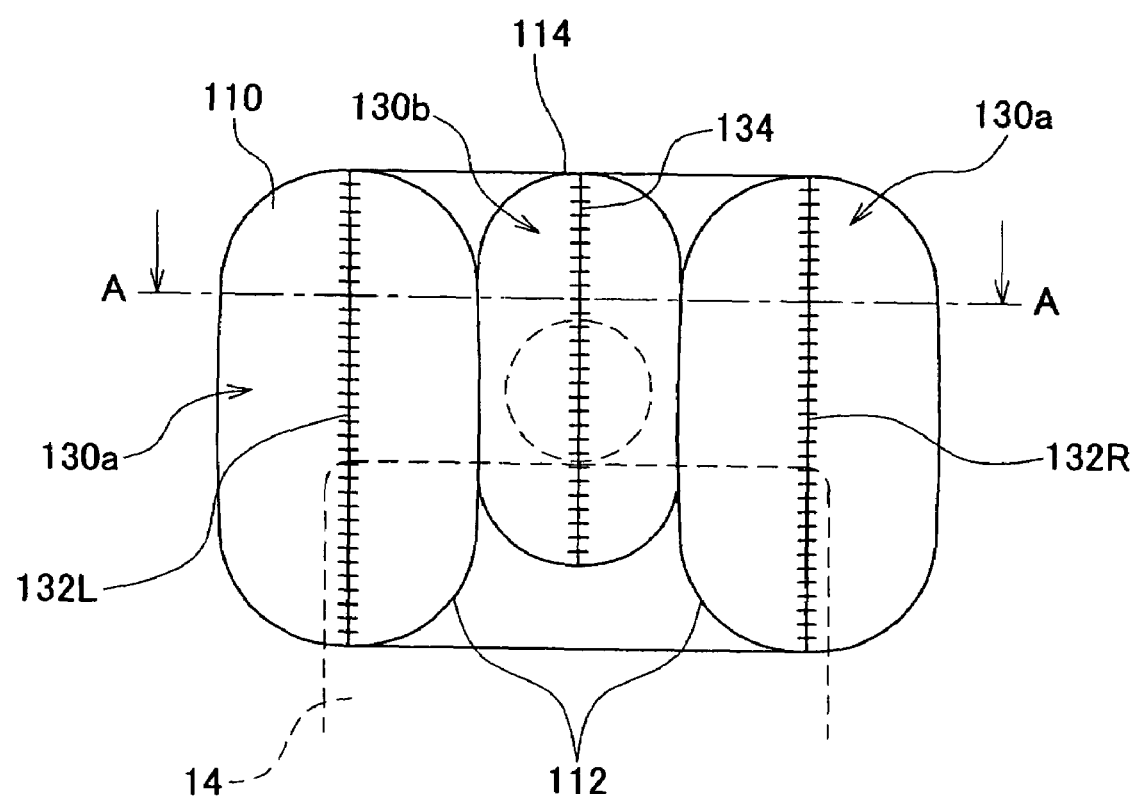
FIG. 3 is a schematic front view of the airbag device according to the first embodiment in an inflated state.
Figure 4:
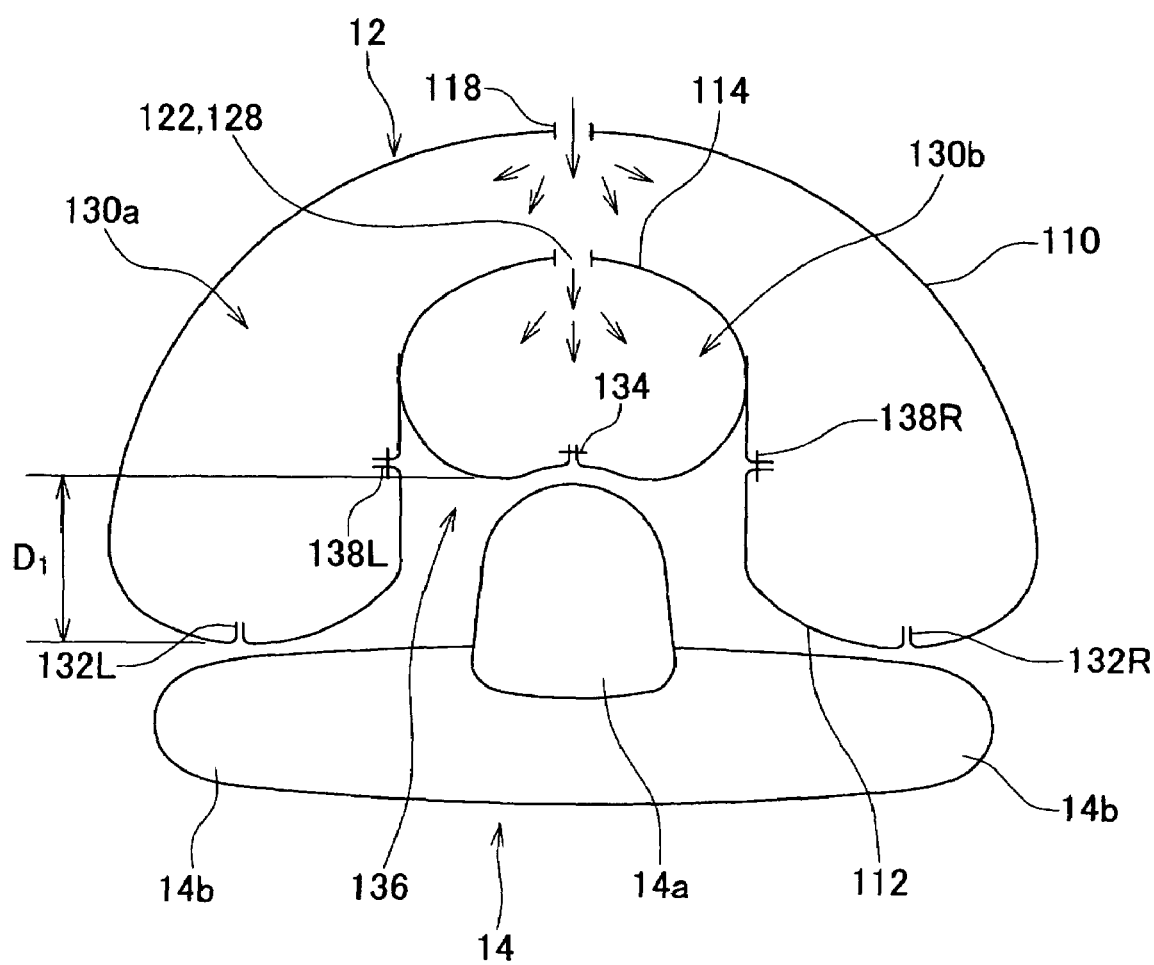
FIG. 4 is a cross-sectional view taken along the line A-A in FIG. 3.

FIG. 2 is a plan view showing (A) a rear panel 110, (B) a front panel 112, and (C) a center panel 114, which constitute an airbag (12) according to a first embodiment of the present invention. FIG. 3 is a schematic plan view showing the airbag (12) according to the first embodiment in an inflated state. Furthermore, FIG. 4 is a cross-sectional view taken along the line A-A in FIG. 3. The airbag (12) according to the present embodiment, considered in terms of its constituent elements (panels), comprises a front panel 112 positioned on the occupant 14 side when inflated, a rear panel 110 positioned on the opposite side to the occupant 14, and a center panel 114. The front panel 112 and the rear panel 110 form a first airbag 130a (see FIG. 3). Furthermore, the center panel 114 forms a second airbag 130b (see FIG. 3).

The front panel 112 and the rear panel 110, which are substantially the same shape, can be laid flat and stitched together at the peripheral edges to form the first airbag 130a. A gas inlet 118 which connects to the inflator 18, is formed in the rear panel 110. On the other hand, a gas port 122 is provided in the front panel 112, which guides the gas introduced from the gas inlet 118 of the rear panel 110 into the second airbag 130b. The gas inlet 118 and the gas port 122 are not connected by stitching or bonding. The center panel 114 is long horizontally as shown in the figures, and is formed from the same material as the front panel 112 and the rear panel 110. A gas inlet 128 which receives the inflating gas that passes through the gas port 122 of the front panel 112 is formed in the center panel 114.

In addition, openings 124L and 124R are cut out of the front panel 112. The two openings 124L and 124R are left-right symmetrically positioned, and are shaped like eyes (or leaves). Subsequently, the opposing left and right edges (sides) 124Ra and 124Rb of the opening 124R are stitched together, thereby closing the opening 124R. In the same manner, the opposing left and right edges (sides) 124La and 124Lb of the opening 124L are stitched together, thereby also closing the opening 124L. The openings 124L and 124R can deviate slightly from the vertical as shown in FIG. 2, or can extend vertically. Furthermore, although the openings 124L and 124R may also be round, the use of an eye shape as in the embodiment enables the radius of curvature (R) of stitching line to be increased, which simplifies the stitching operation.

As shown in FIG. 3 and FIG. 4, in an inflated state, the airbag (12) of the present embodiment comprises the first airbag 130a and the second airbag 130b. As described above, the first airbag 130a is formed from the front panel 112 and the rear panel 110. On the other hand, the second airbag 130b is formed from the center panel 114. In the figure, reference numerals 132L, 132R, 134, 138R, and 138L denote stitched regions (seams).

When the airbag is inflated, the second airbag 130b fits inside a cavity 136 formed near the center of the first airbag 130a on the occupant 14 side. The second airbag 130b is designed with a shorter bottom than the first airbag 130a, to alleviate the impact to the chest area of the occupant 14. Furthermore, the second airbag 130b does not completely fill the cavity 136, and is set back further than the first airbag 130a in the direction away from the occupant 14. This allows the cavity 136 to maintain its shape. In the inflated state, the distance from the frontmost surface of the second airbag 130b to the frontmost surface of the first airbag 130a in the forward and rearward direction (depth D1) is 50 mm or greater. In other words, the second airbag 130b is set back at least 50 mm further than the first airbag 130a. This enables the function of the cavity 136 to be fully realized.

To manufacture the airbag (12) according to the present embodiment, first the front panel 112, the rear panel 110, and the center panel 114 shown in FIG. 2 are prepared. Then, the entire peripheral edges of the front panel 112 and the rear panel 110 are superposed and stitched together by means of a flat seam. Next, the openings 124L and 124R formed in the front panel 112 are closed by stitching together the two opposing sides of each opening. This pulls the front panel 112 inward. Next, the top of the center panel 114 is stitched to the top of the front panel 112, and by folding the left and right ends of the center panel 114 inward and stitching the ends together, the second airbag 130b is formed. Because, according to the present embodiment, the first airbag 130a can be formed by so-called "flat stitching" or "flat seaming", the seaming operation can be streamlined and simplified.

When a vehicle in which the airbag device according to the present embodiment is installed is involved in an incident such as a collision, inflating gas outputted from the inflator 18 is supplied to the first airbag 130a through the gas inlet 118 of the rear panel 110. As a result, the first airbag 130a begins to inflate, and inflating gas is introduced into the second airbag 130b through the hole 128 in the center panel 114. Because the internal pressure of the second airbag 130b is lower than that of the first airbag 130a, a head 14a of the occupant 14 is protected by the relatively more pliable second airbag 130b. As the first airbag 130a inflates, the openings 124R and 124L formed in the front panel 112, which have been closed, restrict the lateral inflation of the first airbag 130a, forming the cavity 136 at or near the center of the first airbag 130a. As shown in FIG. 4, the second airbag 130b does not obstruct (fill) the cavity 136 even when filled with inflating gas and fully inflated.

When the airbag (12) is inflated in this manner, a shoulder area 14b of the occupant 14 contacts the projecting portions on either side of the first airbag 130a, and the head 14a enters the cavity 136 of the airbag. When the intensity of the impact between the airbag and the occupant 14 is relatively small, the head 14a of the occupant 14 may not reach the second airbag 130b, but when the intensity of the impact between the airbag and the occupant 14 is relatively large, the head 14a of the occupant 14 contacts the second airbag 130b and is restrained from forward movement. The chest area of the occupant 14 is protected by the space formed by the cavity 136.

Figure 5:
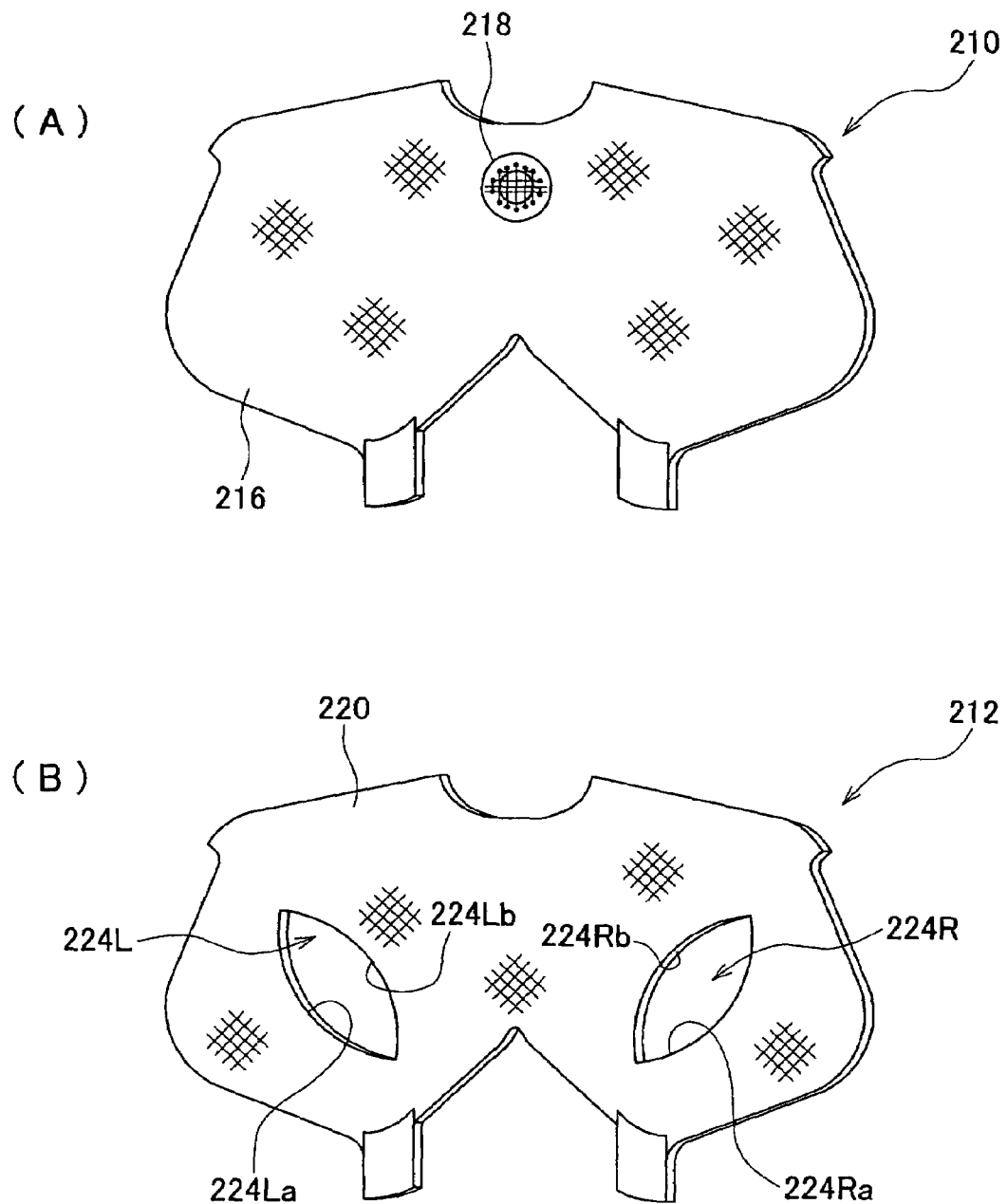
FIG. 5 is a plan view showing a rear panel (A) and a front panel (B) which constitute an airbag of an airbag device according to a second embodiment of the present invention.
Figure 6:
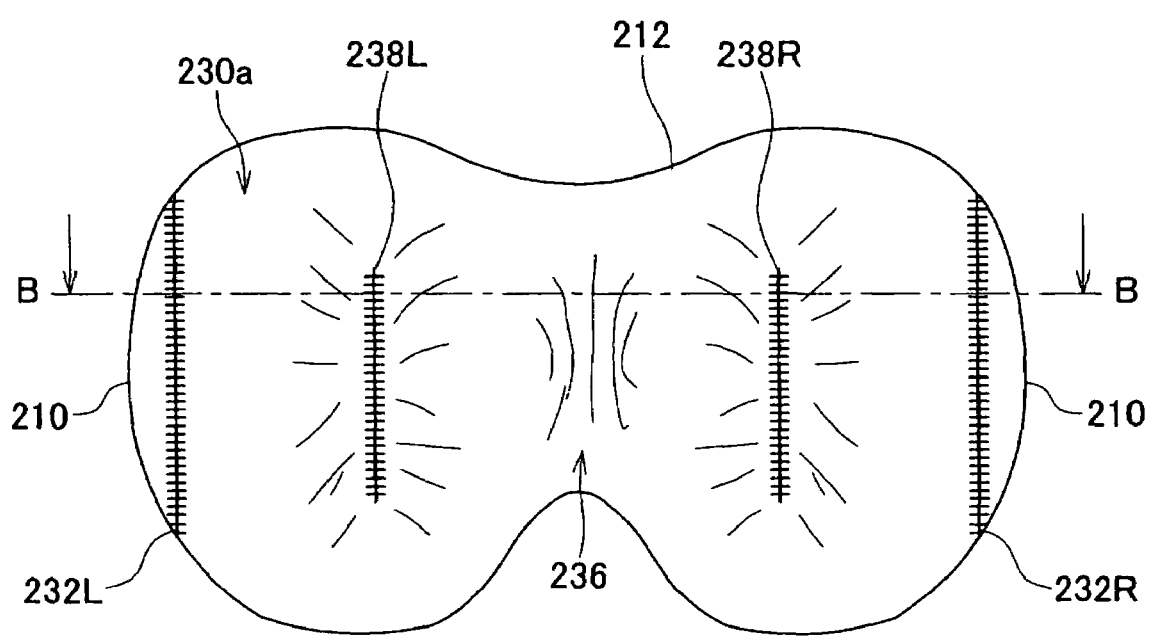
FIG. 6 is a schematic front view of the airbag device according to the second embodiment in an inflated state.
Figure 7:
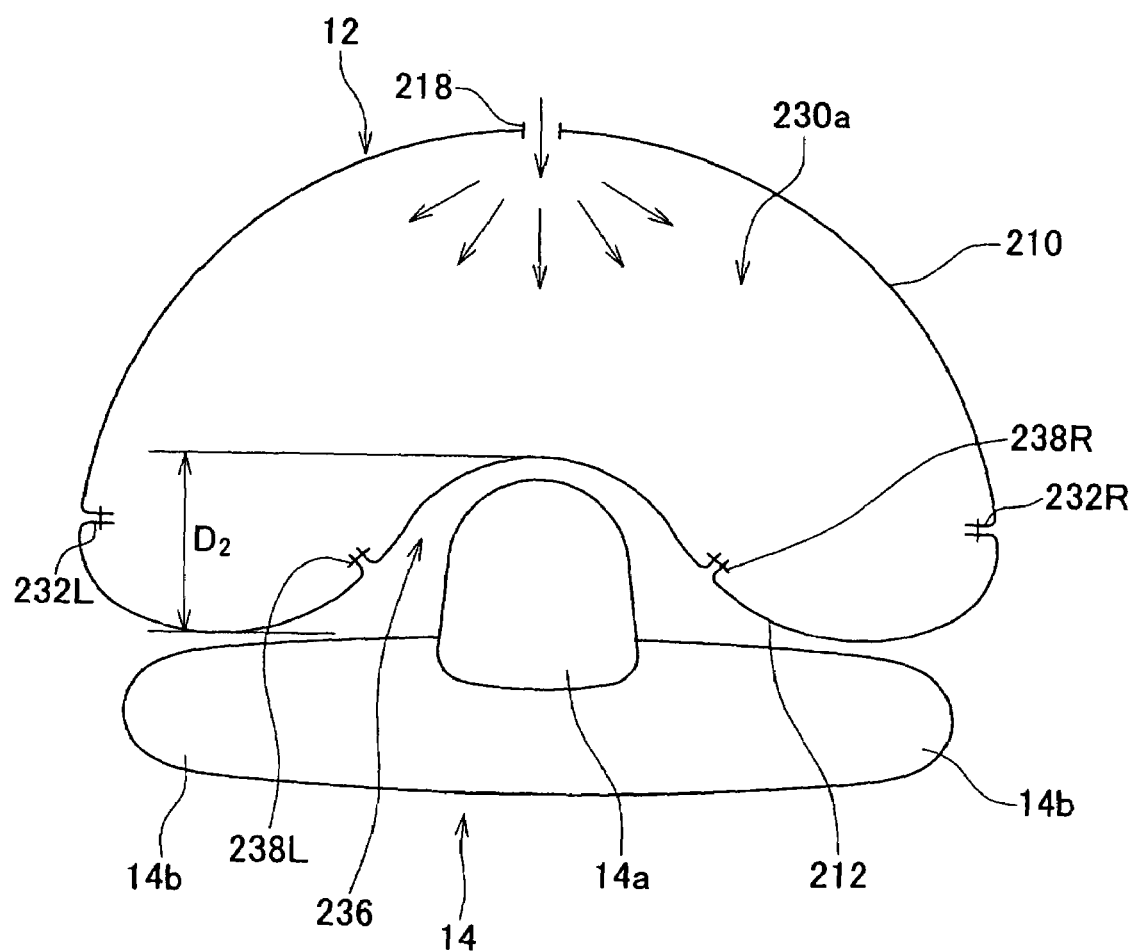
FIG. 7 is a cross-sectional view taken along the line B-B in FIG. 6.

FIG. 5 is a plan view showing a rear panel 210 and a front panel 212 which constitute an airbag (12) according to a second embodiment of the present invention. FIG. 6 is a schematic front view showing the airbag (12) according to the second embodiment in an inflated state. Furthermore, FIG. 7 is a cross-sectional view taken along the line B-B in FIG. 6.

The airbag (12) according to the present embodiment, considered in terms of its constituent elements (panels), includes a front panel 212 positioned on the occupant 14 side when the airbag is inflated, and a rear panel 210 positioned on the opposite side to the occupant 14. The front panel 212 and the rear panel 210 form a first airbag 230a (see FIG. 7). The present embodiment differs from the first embodiment in that a second airbag made up of a center panel is not provided.

The front panel 212 and the rear panel 210, which are substantially the same shape, form the first airbag 230a when stitched together at the edges. A gas inlet 218 which connects to the inflator 18 is formed in the rear panel 210. Openings 224L and 224R are cut out of the front panel 212. The two openings 224R and 224L are left-right symmetrical, and shaped like eyes (or leaves).

Subsequently, the opposing left and right edges (sides) 224Ra and 224Rb of the opening 224R are stitched together, thereby closing the opening 224R. In the same manner, the opposing left and right edges (sides) 224La and 224Lb of the opening 224L are stitched together, thereby also closing the opening 224L. The openings 224L and 224R can deviate slightly from the vertical as shown in FIG. 5, or can extend vertically. Furthermore, although the openings 224L and 224R may also be round, the use of an eye shape as in the embodiment enables t the radius of curvature (R) of stitching line to be increased, which simplifies the stitching operation.

In FIG. 6 and FIG. 7, reference numerals 232L, 232R, 238R, and 238L denote sewn regions (seams). In the present embodiment, the depth D2 of a cavity 236 formed in the first airbag 230a is at least 50 mm.

To manufacture the airbag (12) according to the present embodiment, first the front panel 212 and the rear panel 210 shown in FIG. 5 are prepared. Then, the entire peripheral edges of the front panel 212 and the rear panel 210 are superposed and stitched together by means of a flat seam. Next, the openings 224L and 224R formed in the front panel 212 are closed by stitching together the two opposing sides of each opening. This pulls the front panel 212 inward. Because, according to the present embodiment, the first airbag 230a can be formed by so-called "flat stitching" or "flat seaming", the seaming operation can be streamlined and simplified.

When a vehicle in which the airbag device according to the present embodiment is installed is involved in an incident such as a collision, inflating gas outputted from the inflator 18 is supplied to the inside of the first airbag 230a through the gas inlet 218 of the rear panel 210, causing the first airbag 230a to inflate. As the first airbag 230a inflates, the openings 224R and 224L formed in the front panel 212, which have been closed, restrict the lateral inflation of the first airbag 230a, forming the cavity 236 at or near the center of the first airbag 230a.

When the airbag (12) is inflated in this manner, the shoulder area 14b of the occupant 14 contacts the projecting portions on either side of the first airbag 230a, and the head 14a enters the cavity 236 of the airbag and is restrained from forward movement. The chest area of the occupant 14 is protected by the space formed by the cavity 236.

Although several embodiments of the present invention have been described above, the present invention is not limited to these embodiments, and various modifications are possible within the technical scope of the appended claims.

What is claimed is:

1. An airbag device configured to protect an occupant inside a vehicle by inflating an airbag, comprising:
   a first airbag adapted to face said occupant when inflated said first airbag having a front panel positioned on an occupant side when inflated, and a rear panel positioned on an opposite side to said occupant when inflated, said front and rear panels being shaped substantially the same as each other; and an inflation restricting section which restricts an inflated shape of said first airbag, formed by cutting away a part of said front panel to form an opening in the front panel with an edge, and then closing said opening to form the inflation restricting section with a closed edge, wherein a cavity is formed on said occupant side when said first airbag is inflated, said cavity extending vertically, wherein said opening is formed in two locations left-right symmetrical when viewed from said occupant side.

2. An airbag device according to claim 1, wherein
opposing left and right edges of said opening are stitched together to close said opening.

3. An airbag device according to claim 1, wherein a depth in a forward and rearward direction of said cavity is at least 50 mm.

4. An airbag device according to claim 1, wherein said front panel and said rear panel are connected by stitching peripheral portions thereof together.

5. An airbag device according to claim 1, wherein said opening is formed in an eye shape extending substantially in the vertical direction.

6. An airbag device configured to protect an occupant inside a vehicle by inflating an airbag, comprising:

a first airbag adapted to face said occupant when inflated, said first airbag having a front panel positioned on an occupant side when inflated, and a rear panel positioned on an opposite side to said occupant when inflated, said front and rear panels being shaped substantially the same as each other;

an inflation restricting section which restricts an inflated shape of said first airbag, formed by cutting away a part of said front panel to form an opening in the front panel with an edge, and then closing said opening to form the inflation restricting section with a closed edge, wherein a cavity is formed on said occupant side when said first airbag is inflated, said cavity extending vertically;

an inflatable second airbag within said cavity, wherein said second airbag is formed so as to not completely fill said cavity, and to not project further towards said occupant side than a frontmost surface of said first airbag, and, wherein opposing left and right edges of said opening are stitched together to close said opening and said opening is formed in two locations left-right symmetrical when viewed from said occupant side.

7. An airbag device according to claim 6, wherein
said front panel and said rear panel are connected by stitching peripheral portions thereof together.

8. An airbag device according to claim 6, wherein
said opening is formed in an eye shape extending substantially in the vertical direction.

9. An airbag device according to claim 6, wherein
an end of said second airbag nearest to said occupant side is located at least 50 mm further away from said occupant side than an end of said first airbag nearest to said occupant side.

\* \* \* \* \*